(12) United States Patent
Huh et al.

(10) Patent No.: US 8,654,284 B2
(45) Date of Patent: Feb. 18, 2014

(54) DISPLAY SUBSTRATE, METHOD OF MANUFACTURING THE SAME AND DISPLAY DEVICE HAVING THE SAME

(75) Inventors: Chul Huh, Yongin-si (KR); Gwan-Soo Kim, Cheonan-si (KR); Chang-Soon Jang, Seoul (KR); Sun-Young Chang, Bucheon-si (KR)

(73) Assignee: Samsung Display Co., Ltd. (KR)

( * ) Notice: Subject to any disclaimer, the term of this patent is extended or adjusted under 35 U.S.C. 154(b) by 963 days.

(21) Appl. No.: 12/579,841

(22) Filed: Oct. 15, 2009

(65) Prior Publication Data
US 2010/0271577 A1    Oct. 28, 2010

(30) Foreign Application Priority Data
Apr. 27, 2009    (KR) ................. 10-2009-0036504

(51) Int. Cl.
*G02F 1/1335* (2006.01)
(52) U.S. Cl.
USPC ............... 349/106; 349/96; 349/117

(58) Field of Classification Search
USPC ................ 349/96, 106, 110, 117
See application file for complete search history.

(56) References Cited

U.S. PATENT DOCUMENTS

| | | | | |
|---|---|---|---|---|
| 5,353,133 | A | * | 10/1994 | Bernkopf ..................... 349/5 |
| 5,506,706 | A | * | 4/1996 | Yamahara et al. ............ 349/117 |
| 7,837,780 | B2 | * | 11/2010 | Helber et al. ................. 106/410 |
| 2006/0046163 | A1 | * | 3/2006 | Broer et al. ................... 349/106 |

OTHER PUBLICATIONS

Birendra Bahadur, Liquid Crystals Applications and Uses 1990, World Scientific, vol. 1, pp. 171-194.*

* cited by examiner

*Primary Examiner* — Edward Glick
*Assistant Examiner* — David Chung
(74) *Attorney, Agent, or Firm* — Cantor Colburn LLP (57) ABSTRACT

A display substrate includes a base substrate and first, second and third color filters. The first, second and third color filters are disposed on the base substrate adjacent to each other and convert incident light into color light. At least one of the first, second and third color filters includes pigment particles which are regularly arranged to have refractive index anisotropy.

16 Claims, 6 Drawing Sheets

DISPLAY SUBSTRATE, METHOD OF MANUFACTURING THE SAME AND DISPLAY DEVICE HAVING THE SAME

This application claims priority to Korean Patent Application No. 2009-36504, filed on Apr. 27, 2009, and all the benefits accruing therefrom under 35 U.S.C. §119, the contents of which are herein incorporated by reference in their entirety.

BACKGROUND OF THE INVENTION

1. Field of the Invention

Exemplary embodiments of the invention relate to a display substrate, a method of manufacturing the display substrate, and a display device having the display substrate. More particularly, exemplary embodiments of the invention relate to a display substrate which realizes the color of images using a color filter, a method of manufacturing the display substrate, and a display device having the display substrate.

2. Description of the Related Art

Generally, a liquid crystal display ("LCD") device is a type of flat panel display device, which is widely used. The LCD device includes two substrates on which an electric field generating electrode, such as a pixel electrode or a common electrode, is formed, and a liquid crystal layer interposed between the two substrates. A voltage is applied to the electric field generating electrode to generate an electric field in the liquid crystal layer, and then an alignment of liquid crystal molecules of the liquid crystal layer is determined to control polarized light of incident light, so that images are displayed thereon.

A sense of color corresponding to a front surface of the LCD device is different from a sense of color corresponding to a side of the LCD device. Particular, in a case of low gradation or a black status, the variation of visibility is great even though a sense of color is slightly varied. Thus, black characteristics may be decreased and instead viewed as various colors when viewed from a side of the LCD device, so that the display quality of the LCD device may be decreased.

In order to adjust a side sense of color, a method of adjusting a polarizing plate has been used. However, the method is limited to adjusting the polarizing plate. In addition, it is technically very difficult to satisfy product characteristics of various specifications by using one polarizing plate.

BRIEF SUMMARY OF THE INVENTION

Exemplary embodiments of the invention provide a display substrate having negligible color differences at front and side viewing angles.

Exemplary embodiments of the invention also provide a display device having the above-mentioned display substrate.

Exemplary embodiments of the invention further also provide a method of manufacturing the above-mentioned display substrate.

According to an exemplary embodiment of the invention, a display substrate includes a base substrate and first, second and third color filters. The first, second and third color filters are disposed on the base substrate adjacent to each other to convert incident light into color light. At least one of the first, second and third color filters includes pigment particles that are regularly arranged to have refractive index anisotropy.

In an exemplary embodiment of the invention, the at least one of the color filters having the refractive index anisotropy may have a first refractive index with respect to a horizontal surface parallel with the base substrate, and may have a second refractive index different from the first refractive index in a normal line to the base substrate. The at least one of the color filters having the refractive index anisotropy may include the pigment particles which are collectively arranged in a needle shape or a plate shape. The needle shape or the plate shape may be disposed substantially parallel with the base substrate. The at least one of the color filters having the refractive index anisotropy may include at least one of a red color filter, a green color filter and a blue color filter.

According to another exemplary embodiment of the invention, a display device includes a first substrate, a liquid crystal layer and a second substrate. The liquid crystal layer is disposed on the first substrate. The second substrate includes a base substrate and first, second and third color filters. The base substrate faces the first substrate where the liquid crystal layer is interposed therebetween. The first, second and third color filters are disposed on the base substrate adjacent to each other to convert incident light into color light. At least one of the first, second and third color filters includes pigment particles that are regularly arranged to have refractive index anisotropy.

In an exemplary embodiment of the invention, the at least one of the color filters having the refractive index anisotropy may have a first refractive index with respect to a horizontal surface parallel with the base substrate, and may have a second refractive index different from the first refractive index in a normal line to the base substrate. The display device may further include a first polarizing plate, a second polarizing plate and a retardation compensation film. The first polarizing plate is disposed at an outer side of the first substrate. The second polarizing plate is disposed at an outer side of the second substrate. The retardation compensation film is disposed between the first and second polarizing plates to compensate for a phase difference of the liquid crystal layer. A sense of color of the at least one of the color filters having refractive index anisotropy may be determined to compensate for a side color coordinate difference with respect to a front surface. The side color coordinate difference is generated due to a phase compensation amount deviation by the retardation compensation film. The at least one of the color filters having the refractive index anisotropy may include at least one of a red color filter, a green color filter and a blue color filter.

According to still another exemplary embodiment of the invention, there is provided a method of manufacturing a semiconductor device. In the method, a color photoresist including pigment particles which are cohered into a needle shape or a plate shape, is prepared. The color photoresist is repositioned on a base substrate to be regularly arranged on the base substrate in the needle shape or the plate shape, to form a photoresist film. The photoresist film is patterned to form a color filter on unit pixel areas defined on the base substrate.

In an exemplary embodiment of the invention, to prepare the color photoresist, a mixture material of pigment particles and a pigment dispersing agent may be milled to form a millbase. The formed millbase may be milled to be cohered into a needle shape or a plate shape, so that the pigment particles are more miniaturized to have a large surface area. The amount of the pigment dispersing agent is insufficient so that a high dispersion state may be broken. The dispersion agents may be added in the milled millbase, and the milled millbase in which the dispersion agents are added is milled to form a pigment millbase, in which the pigment particles are cohered into the needle shape or the plate shape. To deposit the color photoresist, the color photoresist may be coated on the base substrate through a slit coating method to form the pigment millbase of the needle shape or the plate shape substantially parallel with the base substrate. A coating velocity of a slit coater performing the slit coating method may be no less than about 50 millimeters per second (mm/sec).

According to exemplary embodiments of a display substrate, a method of manufacturing the display substrate and a display device having the display substrate, a difference between a side view sense of color and a front view sense of color of a display screen may be decreased, so that display quality may be enhanced.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

The invention is described more fully hereinafter with reference to the accompanying drawings, in which exemplary embodiments of the invention are shown. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 1:
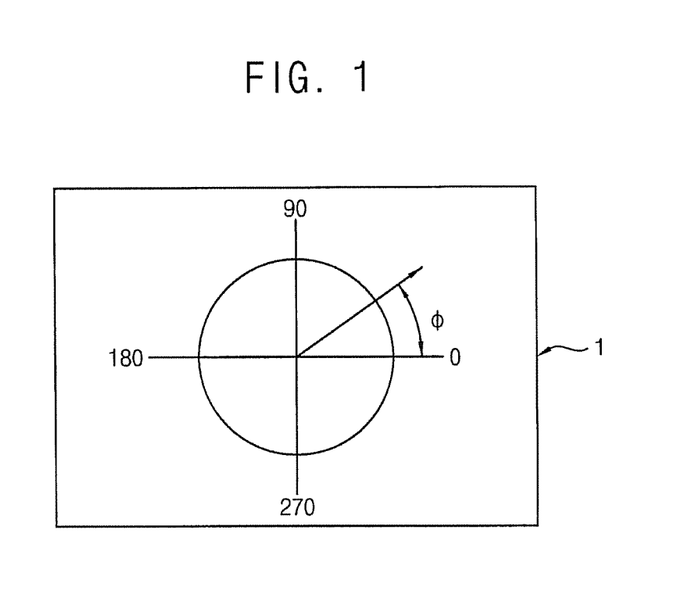
FIG. 1 is a plan view illustrating an exemplary embodiment of a display device according to the invention.
Figure 2:
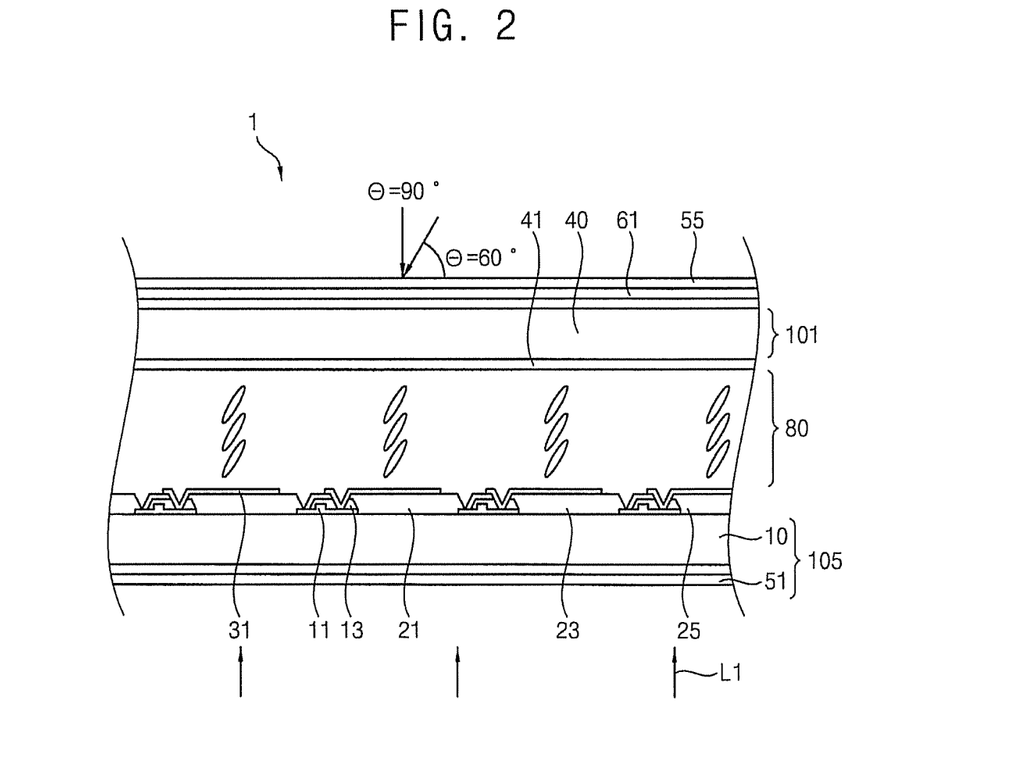
FIG. 2 is a cross-sectional view illustrating the display device of FIG. 1.

FIG. 1 is a plan view illustrating an exemplary embodiment of a display device 1 according to the invention. FIG. 2 is a cross-sectional view illustrating the display device 1 of FIG. 1.

Referring to FIGS. 1 and 2, a display device 1 of the illustrated embodiment includes a first substrate 101, a liquid crystal layer 80 and a second substrate 105.

The first substrate 101 is an upper substrate of the display device 1. The first substrate 101 includes a first base substrate 40 and a common electrode 41. The common electrode 41 may include an optically transparent and electrically conductive material such as indium tin oxide ("ITO"), indium zinc oxide ("IZO"), etc. The common electrode 41 is disposed on the first base substrate 40, and overlaps substantially an entire lower surface of the first base substrate 40.

The second substrate 105 is a display substrate of the illustrated embodiment, and is disposed below the first substrate 101. The second substrate 105 includes a second base substrate 10, a gate line (not shown), a data line (not shown), a switching element 11, a light-blocking pattern 13, a first color filter 21, a second color filter 23, a third color filter 25 and a pixel electrode 31.

The second base substrate 10 includes a glass material or a plastic material. The gate lines are disposed on the second base substrate 10 to be longitudinally extended in a first (e.g., substantially horizontal) direction of the second base substrate 10, in a plan view. The data lines are longitudinally extended in a second (e.g., inclined or vertical) direction of the second base substrate 10, to be electrically insulated from the gate lines.

The switching element 11 may be a triple terminal element such as a thin-film transistor including a gate electrode, a source electrode, a channel layer and a drain electrode. In an exemplary embodiment, the switching element 11 may be disposed at an area in which the gate line and the data line cross each other. The gate electrode and the source electrode are electrically connected to the gate line and the data line, respectively.

The light-blocking pattern 13 may be disposed on (e.g., overlapping) each of the switching element 11, the gate line and the data line. The light-blocking pattern 13 may absorb incident light. The light-blocking pattern 13 may include an organic material. The light-blocking pattern 13 may divide the display device 1 into a plurality of unit pixel areas, such as in a plan view of the display device 1.

The first to third color filters 21, 23 and 25 are arranged on the unit pixel areas in a predetermined arrangement pattern, for example, a mosaic pattern, a stripe pattern, etc. In an exemplary embodiment, the first to third color filters 21, 23 and 25 may be a red color filter, a green color filter and a blue color filter, respectively. At least one of the first to third color filters 21, 23 and 25 may have refractive index anisotropy so that pigment particles are regularly arranged therein. A color filter having refractive index anisotropy will be described as follows. As used herein, "regularly arranged" may be used to describe an arrangement of a plurality of elements being disposed all substantially in a same direction, as all having a substantially similar size or dimension, and/or being disposed to have a substantially uniform distribution, density and/or spacing.

A contact hole which exposes a drain electrode of the switching element 11 is disposed extending completely through the first to third color filters 21, 23 and 25 and the light-blocking pattern 13.

The pixel electrode 31 includes the same material as the common electrode 41. The pixel electrode 31 is disposed on the first to third color filters 21, 23 and 25, such as being disposed overlapping a portion of an upper surface of the first to third color filters 21, 23 and 25. The pixel electrode 31 contacts the drain electrode of the switching element 11 through the contact hole disposed extending completely through the first to third color filters 21, 23 and 25 and the light-blocking pattern 13.

The liquid crystal layer 80 is disposed between the first substrate 101 and the second substrate 105.

The display device 1 may further include a plurality of alignment films (not shown). The alignment films are disposed on the common electrode 41 and the pixel electrode 31. The alignment films may determine an initial alignment direction of the liquid crystal layer 80 when an electric field is off.

The display device 1 may further include a first polarizing plate 51, a second polarizing plate 55 and a retardation compensation film 61.

Referring to FIG. 2, the second polarizing plate 55 is disposed on the first base substrate 40, and may form an uppermost or outermost element of the display device 1. The first polarizing plate 51 is disposed below the second base substrate 10, and may form a lowermost or outermost element of the display device 1. An angle between the first polarization axis of the first polarizing plate 51 and a second polarization axis of the second polarization axis 55 may be determined in accordance with a type of the liquid crystal layer 80 and/or a driving method of the display device 1. In one exemplary embodiment, when liquid crystals of the liquid crystal layer 80 are in a vertical alignment mode, and the LCD device is driven in a normally black mode, the first polarization axis and the second polarization axis may be substantially perpendicular to each other.

The retardation compensation film 61 is disposed between the first base substrate 40 and the second polarizing plate 55. In an alternative embodiment of FIG. 2, the retardation compensation film 61 may be further disposed between the second base substrate 10 and the first polarizing plate 51.

The retardation compensation film 61 compensates a retardation in accordance with a viewing angle $\Theta$ of light transmitting through the liquid crystal layer 80. A compensation amount by the retardation compensation film 61 may be altered in accordance with a wavelength of incident light L1 incident from a lower surface of the second base substrate 10 and azimuth angle $\varnothing$ and a viewing angle $\Theta$, as shown in FIGS. 1 and 2.

Figure 3:
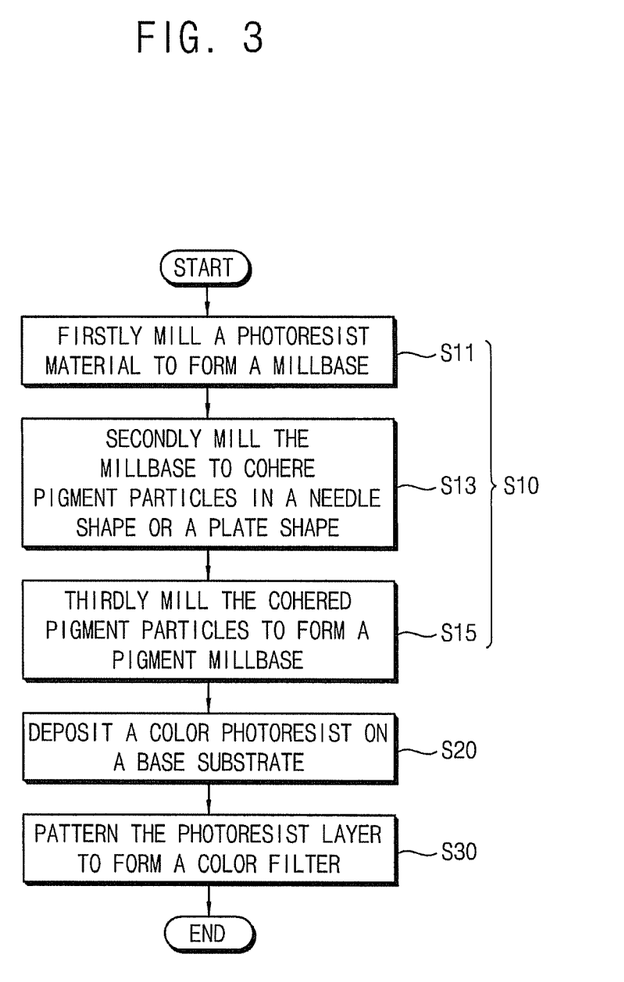
FIG. 3 is a flowchart showing an exemplary embodiment of a method of manufacturing a display substrate according to the invention.
Figure 4A:
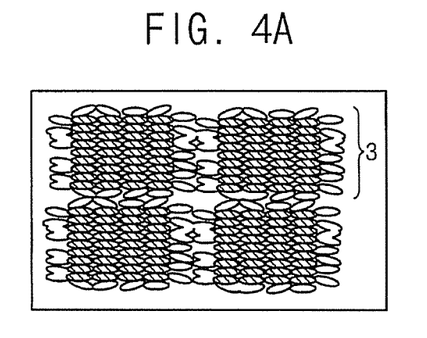
FIGS. 4A, 4B and 4C are process diagrams explaining an exemplary embodiment of a method of manufacturing a color filter photoresist.
Figure 4B:
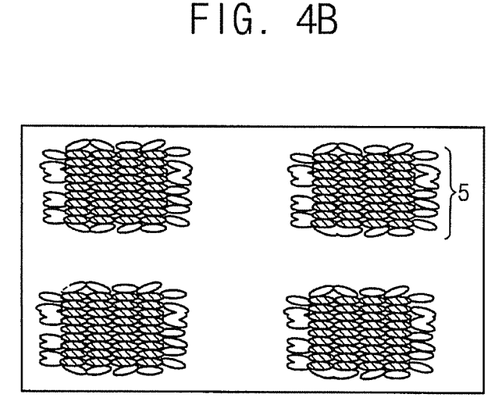
Figure 4C:
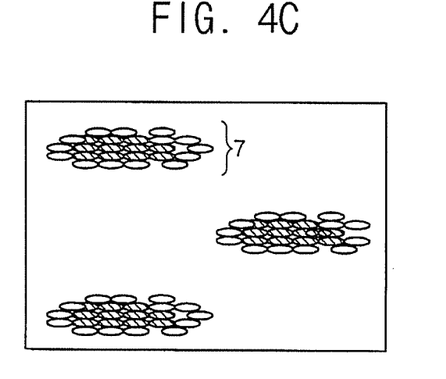

FIG. 3 is a flowchart showing an exemplary embodiment of a method of manufacturing a display substrate according to the invention. FIGS. 4A, 4B and 4C are process diagrams explaining an exemplary embodiment of a method of manufacturing a color filter photoresist.

Referring to FIGS. 3 to 4C, in order to manufacture a display substrate of the illustrated embodiment, that is the second substrate 105, a color photoresist is prepared (step S10).

In order to manufacture the color photoresist, pigment particles and a pigment dispersing agent are mixed to form a mixture material used to manufacture a photoresist material.

The photoresist material is firstly milled to form a millbase (step S11). In an exemplary embodiment, amounts of the pigment particles and amounts of the pigment dispersing agent surrounding the pigment particles are properly controlled, and then the photoresist material is milled by a milling machine during a predetermined time. The pigment particles are milled by the milling, as shown in FIG. 4A, to form fine pigment particles, and the pigment dispersing agent is maintained to have high dispersion properties. As a result, the millbase 3 suitable for manufacturing a color photoresist may be formed.

The millbase 3 illustrated in FIG. 4A collectively includes a plurality of pigment particles indicated by the patterned features in the millbase 3, and the dispersing agent surrounding the pigment particles, indicated by the non-patterned (e.g. white) features in the millbase 3. The dispersing agent is disposed around an outer edge or boundary of the collection of pigment particles. A plurality of the millbase 3 is shown in FIG. 4A.

The millbase 3 is secondly milled (step S13). Due to the second milling, dimensions of individuals of the pigment particles are reduces so that the millbase 3 has a large surface area, and the amount of the pigment dispersing agent is insufficient so that a dispersion state may be broken. As a result, the pigment particles 5 are cohered into a needle shape or a plate shape. In FIG. 4A, a pair of the adjacent millbase 3 are essentially disposed directly next to and contacting each other. In contrast, after the second milling of step S13, the dispersion state of FIG. 4A is broken and groups of the pigment particles 5 are effectively formed, as shown in FIG. 4B.

The pigment particles 5 collectively cohered into the needle shape or the plate shape are thirdly milled (step S15). In an exemplary embodiment, dispersion agents are added at a milling time when a dispersion state is broken by the second milling, and then a fast milling is again performed. As a result, as shown in FIG. 4C, a cohesion of groups of the pigment particles 5 with each other may not be generated, so that a pigment millbase 7 in which a collection of the pigment particles 5 are cohered into a needle shape or a plate shape, is formed.

Figure 5:
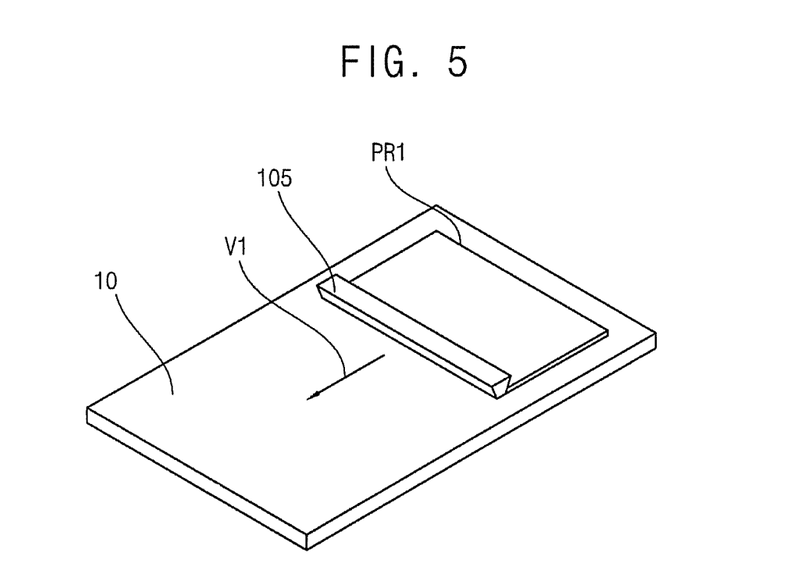
FIG. 5 is a process diagram explaining an exemplary embodiment of a process of depositing a color photoresist on a substrate.

FIG. 5 is a process diagram explaining an exemplary embodiment of a process of depositing a color photoresist on a substrate.

Referring to FIG. 5, the color photoresist (from steps S11, S13 and S15) is deposited on a substrate to form a photoresist layer PR1 (step S20).

In the illustrated embodiment, a deposition of the color photoresist may be performed in a spinless coating method, for example, a slit coating method as described in FIG. 5. The substrate of FIG. 5 may be the second base substrate 10 (FIG. 1) in which the light-blocking pattern 13 is disposed. The pigment particles 5, which are cohered into the pigment millbase 7 (FIG. 4C) having the needle shape or the plate shape by the slit coating, may be regularly arranged on the second base substrate 10 in which the light-blocking pattern 13 is disposed. In the illustrated embodiment, the needle shape or the plate shape is arranged substantially parallel with the second base substrate 10, such that the planar needle shape or the plate shape is observed in a plan view of the second base substrate 10.

As shown in FIG. 5, it is necessary that a coating speed of a slit nozzle 105 is no less than a predetermined velocity V1 in a coating direction, as indicated by the arrow in FIG. 5. In the illustrated embodiment, a coating speed of the slit nozzle 105 of a slit coater may be no less than about 50 millimeters per second (mm/sec). In one exemplary embodiment, the coating speed of the slit nozzle 105 may be no less than about 70 mm/sec. At a speed of no less than about 70 mm/sec, characteristics of a photoresist layer PR1 may be stably maintained, even though the coating speed of the slit nozzle 105 is increased.

Figure 6:
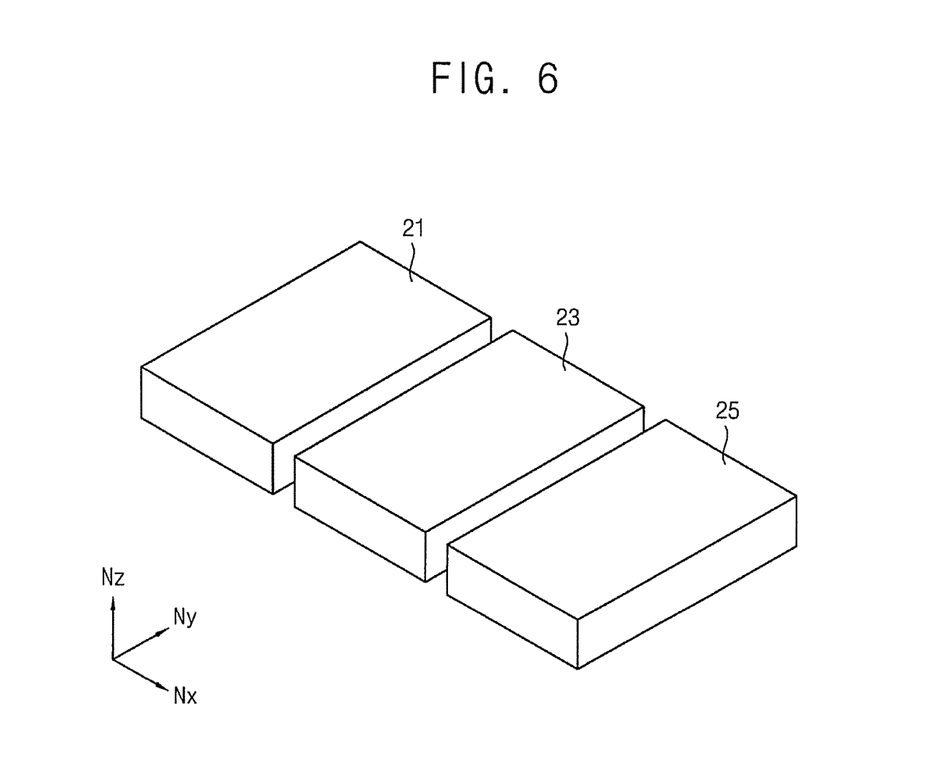
FIG. 6 is a perspective view illustrating an exemplary embodiment of color filters formed by patterning a color photoresist.

FIG. 6 is a perspective view illustrating an exemplary embodiment of color filters 21, 23 and 25 formed by patterning a color photoresist.

Referring to FIGS. 3, 4 and 6, the photoresist layer PR1 is formed, and then the photoresist layer PR1 is patterned to form a color filter (step S30).

In an exemplary embodiment, a photoresist pattern for a mask is formed on the photoresist layer PR1 (FIG. 5), and then the photoresist layer PR1 is etched to form a color filter on the unit pixel areas. As a result, a color filter having the refractive index anisotropy is formed. At least one of the first to third color filters 21, 23 and 25, which does not have refractive index anisotropy, is formed through a color photoresist forming process without a process of forming pigment particles 5 in the needle shape or the plate shape as described in FIGS. 4A to 4C, and then formed through coating and patterning processes.

In the illustrated embodiment, the color filter having the refractive index anisotropy may be a red color filter 21. The pigment particles 5 of the red color filter 21 are cohered into the needle shape and the plate shape as described above, and the needle shape and the plate shape are arranged substantially parallel with the second base substrate 10. The needle shape and the plate shape are arranged on a horizontal surface (e.g., plane) parallel with the second base substrate 10 in a random direction.

Thus, the red color filter 21 has a first refractive index with respect to a predetermined azimuth angle Ø of FIG. 1 relative to the horizontal surface parallel with the second base substrate 10, and has a second refractive index that is different from the first refractive index in a normal direction (that is, Θ=90°) perpendicular to the second base substrate 10. In one exemplary embodiment, when refractive indexes on the horizontal surface (e.g., illustrated in the plan view of the substrate) are represented as 'nx' and 'ny' and a refractive index on the normal direction is represented as 'nz', nx=ny=1.601 and nz=1.619 in accordance with the invention. The green and blue color filters 23 and 25, except the red color filter 21, have refractive index isotropy.

Figure 7:
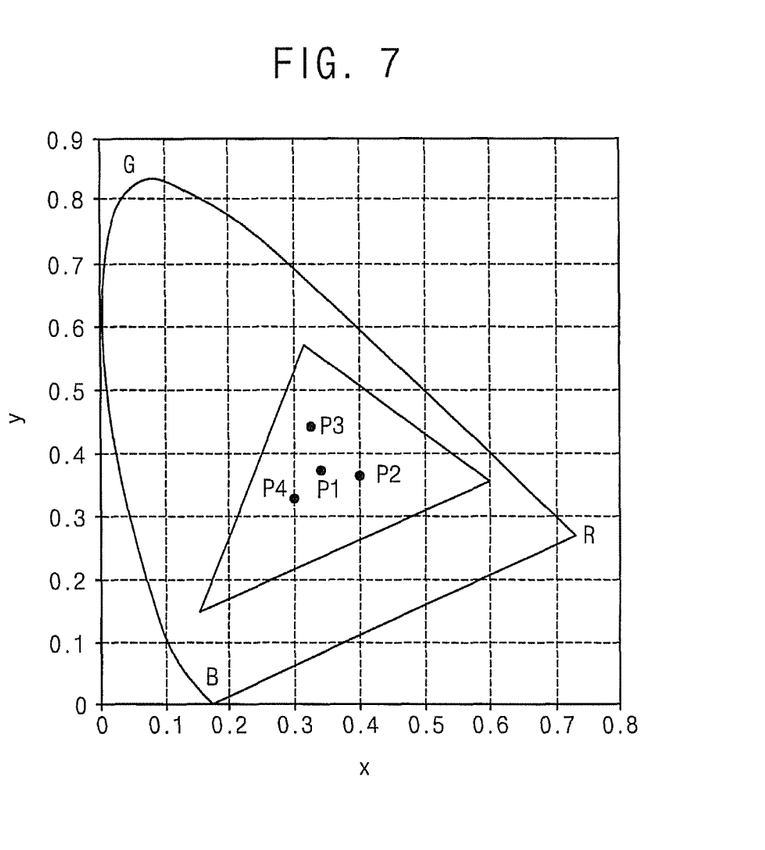
FIG. 7 is a graph illustrating color coordinates and an exemplary embodiment of a range of color realized by the display device of FIG. 2.
Figure 8:
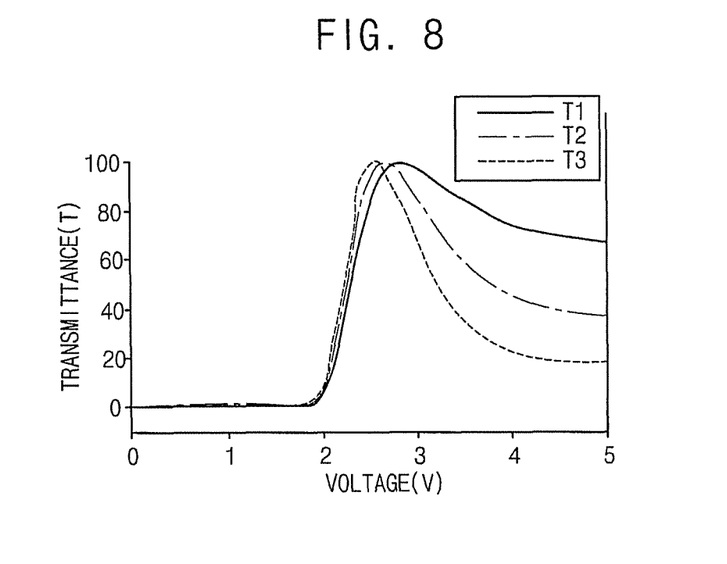
FIG. 8 is a graph illustrating an exemplary embodiment of a relationship between voltage (V) and transmittance (T) of the display device of FIG. 2.

FIG. 7 is a graph illustrating color coordinates and an exemplary embodiment of a range of color realized by the display device 1. FIG. 8 is a graph illustrating an exemplary embodiment of a relationship between voltage (V) and transmittance (T) of a display device 1 of FIG. 2.

In color coordinate area of FIG. 7, an upper portion displays a green color G, a left-lower portion displays a blue color B, and a right-lower portion displays a red color R. A triangle shape displayed within the color coordinate area displays a range of color realized by the display device 1. In FIG. 8, a horizontal axis represents a pixel voltage V applied to the pixel electrode 31, and a vertical axis represents a light transmittance T.

In FIG. 8, T1 represents a voltage-transmittance (V-T) graph corresponding to red color light, T2 represents a V-T graph corresponding to green color light, and T3 represents a V-T graph corresponding to blue color light. As described in FIG. 8, even though identical light is passed through the liquid crystal layer 80, amounts of polarization are different from each other in accordance with a wavelength of light, so that shapes of V-T curves may be different from each other. That is, a V-T curve T3 corresponding to a blue color is rapidly decreased in comparison with a V-T curve T1 corresponding to a red color or a V-T curve T2 corresponding to a green color. The difference of shapes of the V-T curves is increased when a value of Δn·d is increased. In this case, 'Δn·d' represents a phase difference, 'Δn' represents a refractive index anisotropy, and 'd' represents the thickness (e.g., a cell gap) of the liquid crystal layer 80.

When the display device 1 is viewed from a side thereof in a viewing angle Θ as shown in FIG. 2, the length of the liquid crystal layer 80 through which light is passed along the side thereof is longer than that of the liquid crystal layer 80 through which light is passed along a front surface thereof (e.g., where viewing angle Θ=90°). Thus, the value of Δn·d corresponding to a side of the display device 1 is greater than that of Δn·d corresponding to a front surface of the display device 1. Thus, amounts of green light or red light are increased rather than amount of blue light when a side of viewing angle Θ is increased, so that images may be viewed in a yellowish or reddish. Therefore, when images, which are displayed by a conventional display device including a color filter not having any refractive index anisotropy, are viewed, a front surface is displayed as P1 at color coordinates of FIG. 7. Color coordinates corresponding to a side are from P1 toward the red definite point R and the green definite point G to have the shifted color coordinates P2 and P3. Accordingly, the side visibility of the display device 1 may be decreased, so that the display quality of the display device 1 may be decreased.

In the illustrated embodiment, the retardation compensation film 61 compensates a phase difference in accordance with a viewing angle Θ as described above to decrease the difference of Δn·d in front and at sides of the display device 1. The retardation compensation film 61 suppresses the yellowish or reddish tendency of images displayed on the display device 1. A compensation of the retardation compensation film 61 has a deviation in accordance with the viewing angle Θ, the azimuth angle Ø and wavelength of light, so that the display device 1 may have color coordinates P4 which a sense of color of an image is viewed in a bluish in accordance with the viewing angle Θ.

The sense of color of the color filter having the refractive index anisotropy may be determined to compensate for a side color coordinate change with respect to a front surface, which is generated due to the deviation of a phase compensation amount by the retardation compensation film 61. In the illustrated embodiment, a portion of the color filter having refractive index anisotropy may include the red color filter 21.

In the red color filter 21, 'nz' is different from both 'nx' and 'ny'. Thus, light passing through the red color filter 21 has an increased red light amount when a viewing angle Θ is increased. Therefore, bluish defects, which are generated due to an imbalance of a compensation of the retardation compensation film 61, cancel each other. Accordingly, a sense of color of a front surface may be substantially the same as a side sense of color, so that the display quality of the display device may be enhanced.

Figure 9:
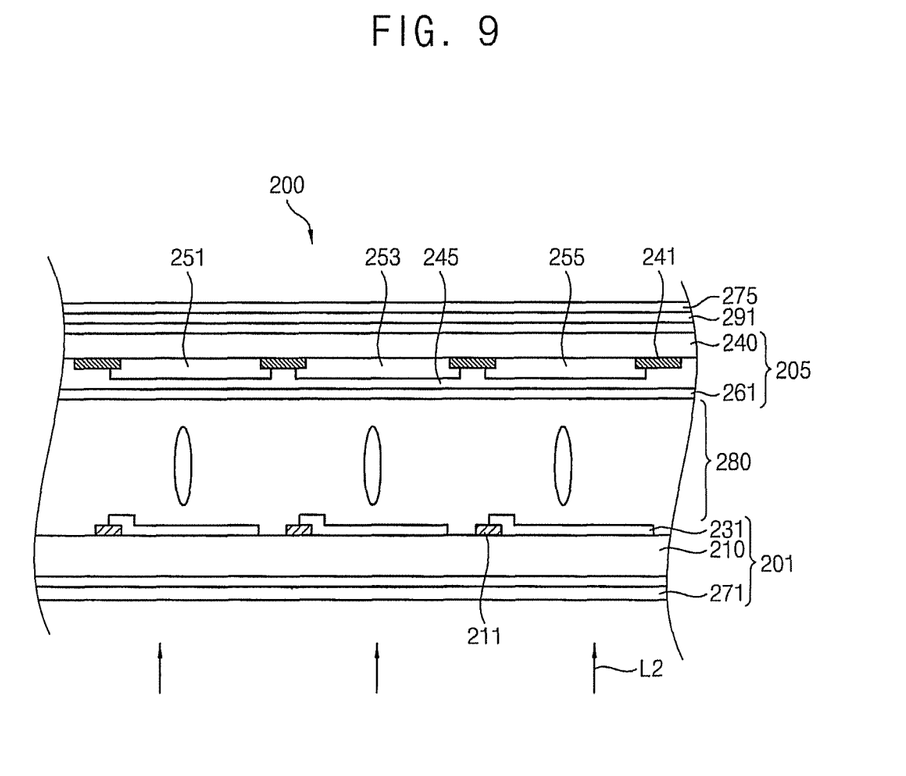
FIG. 9 is a cross-sectional view illustrating another exemplary embodiment of a display device according to the invention.

FIG. 9 is a cross-sectional view illustrating another exemplary embodiment of a display device 200 according to the invention.

Referring to FIG. 9, a second substrate 205 of the present embodiment is an upper substrate of the display device 200. The second substrate 205 includes a second base substrate 240, a light-blocking pattern 241, a first color filter 251, a second color filter 253, a third color filter 255, an overcoating layer 245 and a common electrode 261.

The first to third color filters 251, 253 and 255 are disposed on the second base substrate 240 adjacent to each other, and the light-blocking pattern 241 is disposed at a boundary area between the adjacent first to third color filters 251, 253 and 255. At least one of the first to third color filters 251, 253 and 255 may have refractive index anisotropy, so that pigment particles are regularly arranged thereon. Exemplary embodiments of which the pigment particles are formed to have directional properties are substantially the same as the illustrated embodiments of FIGS. 1 to 8. Thus, a detailed description thereof will be omitted. The overcoating layer 245 is disposed on the first to third color filters 251, 253 and 255, and the light-blocking pattern 241. The common electrode 261 is disposed on the overcoating layer 245. Each of the overcoating layer 245 and the common electrode 261 is a single unitary indivisible member disposed overlapping substantially an entire of the second base substrate 240.

In an exemplary embodiment of a method of manufacturing the display substrate of the illustrated embodiment, forming the first to third color filters 251, 253 and 255 by depositing a color filter photoresist on the second base substrate 240 including the light-blocking pattern 241 formed thereon, is substantially the same as forming the color filter as described in FIGS. 4A to 4C. Thus, a detailed description thereof will be omitted. The overcoating layer 245 covering (e.g., overlapping) the light-blocking pattern 241 and the color filters 251, 253 and 255 is formed after forming the color filters 251, 253 and 255. The common electrode 261 is formed on the overcoating layer 245, to manufacture a display substrate, that is, the second substrate 205.

The display device 200 according to the illustrated embodiment includes a first substrate 201, a liquid crystal layer 280 and the second substrate 205, a first polarizing plate 271, a second polarizing plate 275 and a retardation compensation film 291. The display device 200 includes the first substrate 201, that is a lower substrate, and the second substrate 205, that is an upper substrate. The first substrate 201 includes a first base substrate 210, a plurality of gate lines (not shown), a plurality of gate data lines (not shown), a plurality of gate switching elements 211 and a plurality of gate pixel electrodes 231.

The first polarizing plate 271 is disposed below the first base substrate 210, and the second polarizing plate 275 is disposed on the second base substrate 240. The retardation compensation film 291 is disposed between the second base substrate 240 and the second polarizing plate 275.

According to the present embodiment, light L2 incident from a lower surface of the first base substrate 210 passes through the liquid crystal layer 280. The light passing through the liquid crystal layer 280 passes through a color filter including a portion having an isotropic refractive index to be maintaining a polarizing status. However, a phase difference of light passing through a color filter having refractive index anisotropy is changed in accordance with a viewing angle Θ. A phase difference of light passing through the first to third color filters 251, 253 and 255 is compensated by the retardation compensation film 291. A difference of sense of color corresponding to a front image and a side image may be decreased due to a portion of the color filter having refractive index anisotropy.

According to the invention, refractive index anisotropy is applied to a portion of a color filter, so that a phase difference of light incident to or passing through a liquid crystal layer may be varied. Thus, a phase difference compensation of light according to a viewing angle may be enhanced, so that a difference of sense of color corresponding to a front image and a side image may be decreased. Therefore, according to the invention, the display quality of a display device having a color filter may be enhanced.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display substrate comprising:
a base substrate which faces each of:
an opposing substrate,
a liquid crystal layer between the base and opposing substrates,
a first polarizing plate at an outermost surface of the base substrate;
a second polarizing plate at an outermost surface of the opposing substrate; and
a retardation compensation film which is between the first and second polarizing plates, and compensates for a phase difference of the liquid crystal layer; and
first, second and third color filters disposed on the base substrate and adjacent to each other, wherein the color filters convert incident light into color light, and at least one of the first, second and third color filters comprises pigment particles which are regularly arranged to have refractive index anisotropy,
wherein a sense of color of the at least one of the color filters having the refractive index anisotropy is determined to compensate for a side color coordinate difference with respect to a front surface, wherein the side color coordinate difference is generated due to a phase compensation amount deviation by the retardation compensation film.

2. The display substrate of claim 1, wherein the at least one of the color filters having the refractive index anisotropy, has a first refractive index with respect to a horizontal surface parallel with the base substrate, and has a second refractive index different from the first refractive index in a normal line to the base substrate.

3. The display substrate of claim 1, wherein the at least one of the color filters having the refractive index anisotropy comprises at least one of a red color filter, a green color filter and a blue color filter.

4. The display substrate of claim 1, further comprising:
a plurality of electrodes respectively overlapping the first, second and third color filters in a plan view of the display substrate;
a plurality of switching elements electrically connected to output terminals of the electrodes;
a gate line electrically connected to a control terminal of the switching elements; and
a data line electrically connected to an output terminal of the switching elements.

5. The display substrate of claim 1, further comprising:
a light-blocking pattern disposed at a boundary between adjacent first to third color filters, respectively; and
an overcoating layer overlapping the first, second and third color filters and the light-blocking pattern in a plan view of the display substrate.

6. A display device comprising:
a first substrate;
a liquid crystal layer disposed on the first substrate; and
a second substrate comprising:
a base substrate disposed opposing the first substrate with respect to the liquid crystal layer interposed therebetween; and
first, second and third color filters disposed on the base substrate and adjacent to each other, wherein the color filters convert incident light into color light, and at least one of the first, second and third color filters comprises pigment particles which are regularly arranged to have refractive index anisotropy;
a first polarizing plate disposed at an outermost surface of the first substrate;
a second polarizing plate disposed at an outermost surface of the second substrate; and
a retardation compensation film disposed between the first and second polarizing plates, wherein the retardation compensation film compensates for a phase difference of the liquid crystal layer,
wherein a sense of color of the at least one of the color filters having the refractive index anisotropy is determined to compensate for a side color coordinate difference with respect to a front surface, wherein the side color coordinate difference is generated due to a phase compensation amount deviation by the retardation compensation film.

7. The display device of claim 6, wherein the at least one of the color filters having the refractive index anisotropy comprises at least one of a red color filter, a green color filter and a blue color filter.

8. The display device of claim 6, wherein the second substrate further comprises:
an electrode disposed on the first to third color filters and opposing the first substrate relative to the liquid crystal layer;
a plurality of switching elements disposed between the base substrate and the first to third color filters, wherein the plurality of switching elements is electrically connected to the electrode disposed on the first to third color filters;
a gate line delivering a control signal to the switching element; and
a data line delivering a source signal to the switching element.

9. The display device of claim 6, wherein
the first substrate comprises a plurality of switching elements; and
the second substrate further comprises an electrode disposed opposing the first substrate relative to the liquid crystal layer, and the first to third color filters are disposed between the electrode and base substrate.

10. The display device of claim 9, wherein the second substrate further comprises an overcoating layer overlapping the first to third color filters in the plan view of the display device, and the first to third color filters are disposed between the overcoating layer and the base substrate.

11. A method of manufacturing the display substrate of claim 1, the method comprising:

depositing a color photoresist on the base substrate, wherein the color photoresist includes the pigment particles which are cohered into a group of pigment particles forming a needle shape or a plate shape in a plan view of the base substrate, and the group of pigment particles are regularly arranged on the base substrate, to form a photoresist film; and patterning the photoresist film to form the at least one of the color filters having the refractive index anisotropy on a unit pixel area defined on the display substrate.

12. The method of claim 11, further comprising preparing the color photoresist, comprising:

milling a mixture material of the pigment particles and a pigment dispersing agent to form a millbase;

milling the formed millbase to cohere the pigment particles into the group of pigment particles so that a dimension of the pigment particles are reduced to have a large surface area, and the amount of the pigment dispersing agent is insufficient so that a dispersion state of the pigment particles is broken; and adding dispersion agents in the milled millbase and milling the milled millbase in which the dispersion agents are added, to form a pigment millbase in which the group of pigment particles forms the needle shape or the plate shape.

13. The method of claim 12, wherein the depositing the color photoresist comprises:

coating the color photoresist on the base substrate through a slit coating method, to form the pigment millbase of the needle shape or the plate shape, which is disposed substantially parallel with the base substrate.

14. The method of claim 13, wherein a coating velocity of a slit coater performing the slit coating method, is no less than about 50 millimeters per second.

15. The display substrate of claim 2, wherein the at least one of the color filters having the refractive index anisotropy comprises the pigment particles, which are collectively arranged in a needle shape or a plate shape, and the needle shape or the plate shape is disposed substantially parallel with the base substrate.

16. The display device of claim 6, wherein the at least one of the color filters having the refractive index anisotropy comprises the pigment particles, which are collectively arranged in a needle shape or a plate shape, and the needle shape or the plate shape is disposed substantially parallel with the base substrate.

* * * * *